United States Patent [19]
Fujii

[11] Patent Number: 5,191,768
[45] Date of Patent: Mar. 9, 1993

[54] AUTOMOBILE AIR CONDITIONER COMPRESSOR DISCHARGE CAPACITY CONTROLLER

[75] Inventor: Kazuo Fujii, Konan, Japan
[73] Assignee: Zexel Corporation, Tokyo, Japan
[21] Appl. No.: 824,524
[22] Filed: Jan. 23, 1992
[30] Foreign Application Priority Data
Apr. 26, 1991 [JP] Japan .................................. 3-125267
[51] Int. Cl.$^5$ ............................................. F25B 41/00
[52] U.S. Cl. .................................... 62/209; 62/176.6; 62/229
[58] Field of Search ................... 62/176.6, 209, 223, 62/229

[56] References Cited
U.S. PATENT DOCUMENTS

| | | | |
|---|---|---|---|
| 4,412,424 | 11/1983 | Iida et al. .............................. | 62/209 |
| 4,482,007 | 11/1984 | Yoshimi et al. ................... | 62/209 X |
| 4,877,081 | 10/1989 | Ohtsu ................................. | 62/209 X |
| 4,907,416 | 3/1990 | Fujii ................................... | 62/209 X |
| 4,920,755 | 5/1990 | Tadahiro ............................ | 62/176.6 |

Primary Examiner—Stephen M. Hepperle
Attorney, Agent, or Firm—Wenderoth, Lind & Ponack

[57] ABSTRACT

Compressor discharge capacity is controlled by using the smaller value as a desired cooling temperature for control, comprising a first desired evaporator cooling temperature computed from the pattern of the desired cooling temperature characterized by its being high when a cooling load is low, with a second desired evaporator cooling temperature computed from the pattern of the desired cooling temperature characterized by its being high when the outdoor temperature is moderate, and by its being low when the outdoor temeprature is low or high. Therefore, if the desired temperature is set high in a passenger compartment when the outdoor temperature is high, or if a cooling load is low when the outdoor temperature is low, the desired cooling temperature can be kept low for controlling while maintaining high dehumidifying capacity.

5 Claims, 5 Drawing Sheets

AUTOMOBILE AIR CONDITIONER COMPRESSOR DISCHARGE CAPACITY CONTROLLER

BACKGROUND OF THE INVENTION

1. Field of the Invention

This invention pertains to a controller for controlling discharge capacity of a compressor used for executing a cooling cycle of an automobile air conditioner.

2. Description of the Related Art

An extensive variety of discharge-capacity controllers of automobile air conditioner compressors have been manufactured in the past. One well-known type of said controllers is introduced in Japanese Laid-open Patent Publication 62-94748; in this type of controller, a desired cooling temperature of evaporator is determined according to the temperature of the air vented out of the air vent, and the discharge capacity of the compressor is controlled at variable levels to produce the desired cooling temperature.

This type of controller is characterized by the fact that the aforementioned desired cooling temperature changes, according to environmental conditions inside/outside the passenger compartment and set temperature inside the passenger compartment. For example, if the outdoor temperature is low when the air conditioner is turned on, the cooling load is lower than that when the outdoor temperature is high, unless a specific condition is present; the temperature is set high, the cooling load is lower than that when the temperature is set low, as long as other environmental conditions remain unchanged; therefore, the desired cooling temperature can be set high.

However, if the temperature is manually set higher in the passenger compartment when temperature and humidity are high, as, in fact, they are in summer in Japan, the desired cooling temperature rises, which reduces the cooling capacity of evaporator, and the dehumidifying capacity, accordingly, is reduced, often causing the passengers to feel humidity, which is uncomfortable.

On the other hand, when the outdoor temperature is low in rainy weather, the desired cooling temperature rises since the cooling load is lower than that when the outdoor temperature is reduced, causing an insufficient dehumidifying effect and generating fog on the wind shield, which is a problem.

As to the dehumidifying function, Japanese Laid-open Patent Publication H2-290712 introduces one well-known example, in which the dehumidifying capacity of the evaporator is reduced by reducing the compressor's discharging capacity when humidity is lower than a specific level in the passenger compartment, and thus, the air-mixing door is controlled to prevent the changes in the temperature of vented air so that the temperature of the vented air will not rise. In other words, this function prevents the humidity from being reduced in the passenger compartment, by reducing the dehumidifying capacity while keeping the temperature of the vented air at the same level.

SUMMARY OF THE INVENTION

This invention aims to offer a discharge-capacity controller of an automobile air conditioner compressor, which controls an evaporator to exert the cooling capacity according to the cooling load while preventing a reduction in dehumidifying capacity when the outdoor temperature is high, simultaneously maintaining the dehumidifying capacity when the outdoor temperature is low.

As is explained in an example of the preferred embodiment of the present invention, the automobile air conditioner compressor discharge capacity controller is equipped with an evaporator, installed inside the air duct of the air conditioner, and with a compressor of a variable discharge capacity, which executes the cooling cycle together with the aforementioned evaporator, an expansion valve and a condenser, and this controller controls the discharge capacity by means of its variable discharge capacity structure. This automobile air conditioner compressor discharge capacity controller is further equipped with an evaporator temperature-sensing means for sensing the temperature of the evaporator; a heat load signal-computing means for computing the heat load signals to control the air conditioner for environmental conditions inside/outside the passenger compartment such as the temperature in the passenger compartment, the outdoor temperature, and set temperature in the passenger compartment; a first evaporator cooling temperature-setting means for setting the first desired temperature for the aforementioned evaporator based on the aforementioned heat load signals and the pattern of the desired cooling temperature characterized by being high when the cooling load is low; a second evaporator cooling temperature-setting means for setting the second desired cooling temperature for the aforementioned evaporator based on the pattern of the desired cooling temperature is moderate and by being low when the outdoor temperature is low or high; a desired cooling temperature-selecting means that compares the first desired cooling temperature set by the aforementioned first evaporator cooling temperature-setting means, with the second desired cooling temperature set by the aforementioned second evaporator cooling temperature-setting means, when the aforementioned evaporator cooling temperature sensed by the aforementioned evaporator temperature sensing means is above a specific value, and selects the lower desired cooling temperature; and a compressor discharge capacity-controlling means for controlling the variable capacity mechanism of the aforementioned variable discharge capacity compressor based on the desired cooling temperature selected by the aforementioned desired cooling temperature selecting means.

Therefore, according to this invention, if the desired cooling temperature is set high in the passenger compartment when the outdoor temperature is high, the first desired cooling temperature rises as the cooling load is reduced, but the second desired cooling temperature drops when the outdoor temperature is high. And when the first desired cooling temperature is lower than the second desired cooling temperature, the first desired cooling temperature is selected. When the first desired cooling temperature is higher than the second desired temperature, the second desired cooling temperature is selected. And according to this selected desired cooling temperature, the discharge capacity of the compressor is determined. By so doing, the desired cooling temperature for controlling can remain low, which results in prevention of the reduction in dehumidifying capacity.

It will not be difficult to add many other advantages such as structural changes and other additional objectives to the present invention for those who are engaged in this field of business, if they examine the attached drawings illustrating the preferred embodiment of the invention which includes the detailed description and the principle regarding the present invention.

DESCRIPTION OF THE PREFERRED EMBODIMENT

An example of the application of the present invention is given below in reference to the FIGURES.

Figure 1:
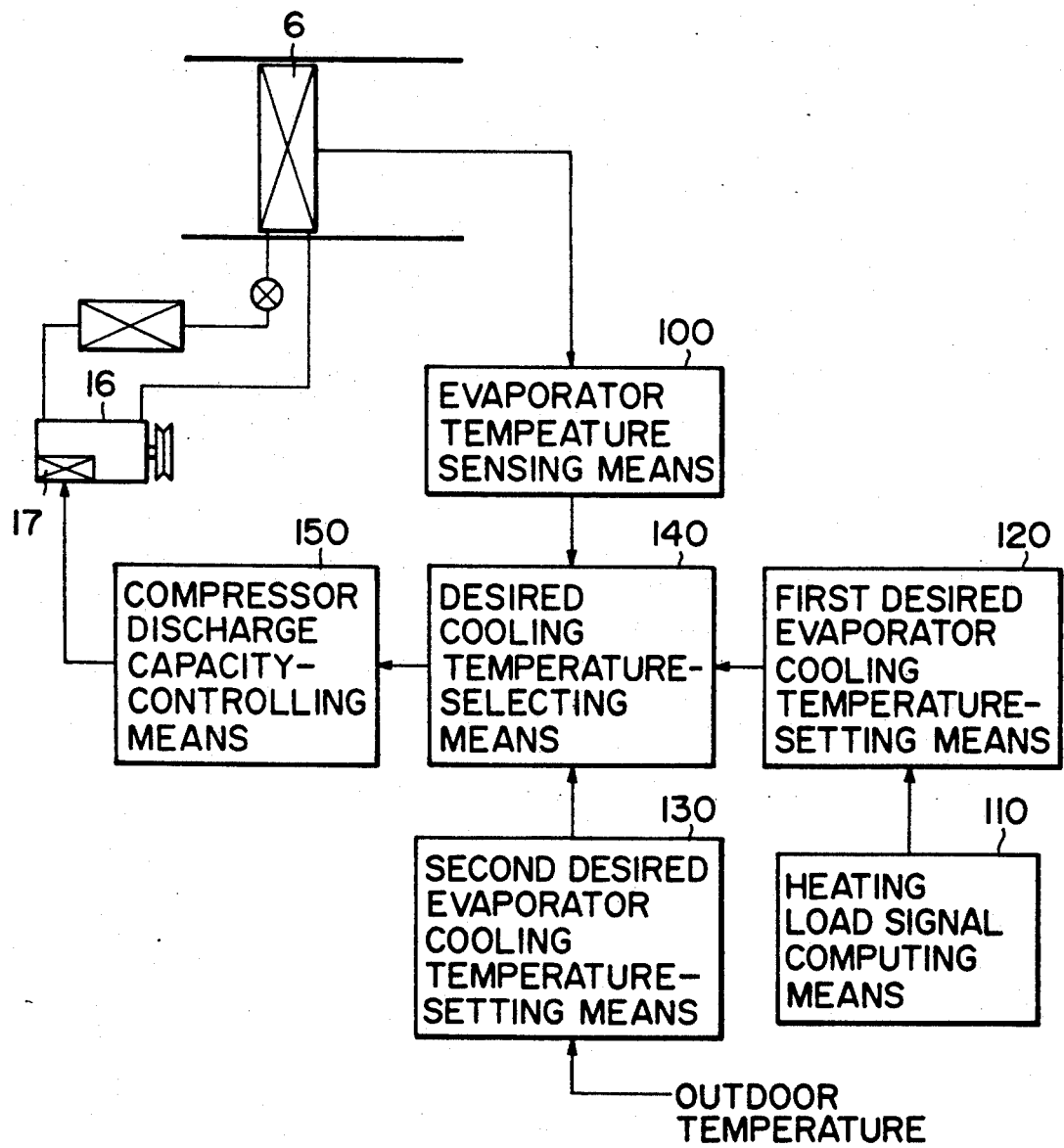
FIG. 1 shows a diagram explaining the structure of the controller of the present invention.

The function of the invented product is explained first in reference to FIG. 1. In this invention, the cooling temperature of evaporator 6 is detected by evaporator temperature-sensing means 100, and by heat load signal computation means 110, the heat load signals controlling the air conditioner are computed based on the environmental conditions inside/outside the passenger compartment, including the temperature in the passenger compartment, outdoor temperature, and the set temperature. By the first evaporator cooling temperature setting means 120, the first desired cooling temperature of the aforementioned evaporator 6 is set, based on the aforementioned heat load signals, according to the pattern characteristic of the desired cooling temperature which rises when the cooling load is low. And at the same time, by the second evaporator cooling temperature setting means 130, the second desired cooling temperature of the aforementioned evaporator is set according to the pattern characteristic of the desired cooling temperature which rises when the outdoor temperature is moderate, and drops when the outdoor temperature is low or high. When the aforementioned evaporator temperature sensed by the aforementioned evaporator temperature-sensing means is above the specific level, the desired cooling temperature-selecting means 140 compares the first cooling temperature set by the aforementioned evaporator cooling temperature-setting means, with the second desired cooling temperature set by the aforementioned second evaporator cooling temperature-setting means, and selects the lower of the two. And by the compressor discharge capacity-controlling means 150, the aforementioned variable capacity structure 17 of the aforementioned variable discharge capacity compressor 16 is controlled based on the desired cooling temperature selected by the aforementioned desired cooling temperature-selecting means 150.

Figure 2:
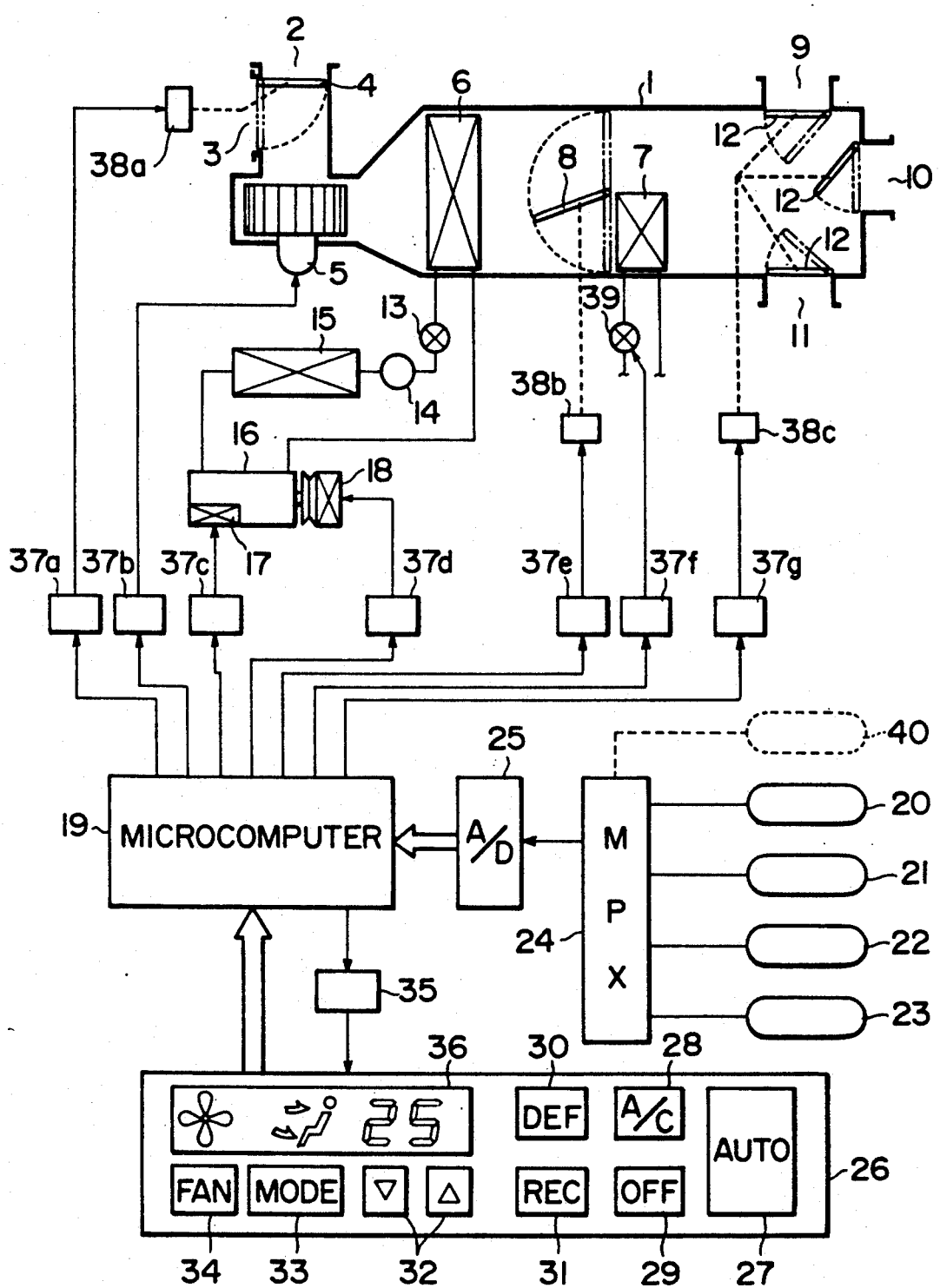
FIG. 2 illustrates the automobile air conditioner referred to, in an example of the application of the present invention.

FIG. 2 shows a diagram of the automobile air conditioner, which has, on the upflow side of the air conditioner duct 1, outdoor air-intake 2, indoor air-intake 3, and indoor air-intake/outdoor air-intake switching door 4 which appropriately selects either of the outdoor air-intake 2 or the indoor air-intake 3. Fan 5 is to introduce air into the air conditioner duct 1 toward its downflow side, and behind the fan 5, is positioned evaporator 6. This evaporator 6 is connected, by means of a pipe, to variable discharge capacity compressor 16 equipped with expansion valve 13, receiver tank 14, and condenser 15, and to variable discharge capacity structure 17, all of which execute the cooling cycle.

Behind the aforementioned evaporator 6, is positioned heater core 7, the energy source of which is the water for cooling the engine, and on the upflow side of the heater core 7, is installed air-mixing door 8 controlling the amount of air passing through heater core 7.

In the lower area of the downflow side of the air conditioning duct 1, DEF vent 9, exhaust vent 10, and foot vent 11 are opened, and their opening level can be adjusted selectively by means of mode door 12.

Figure 3:
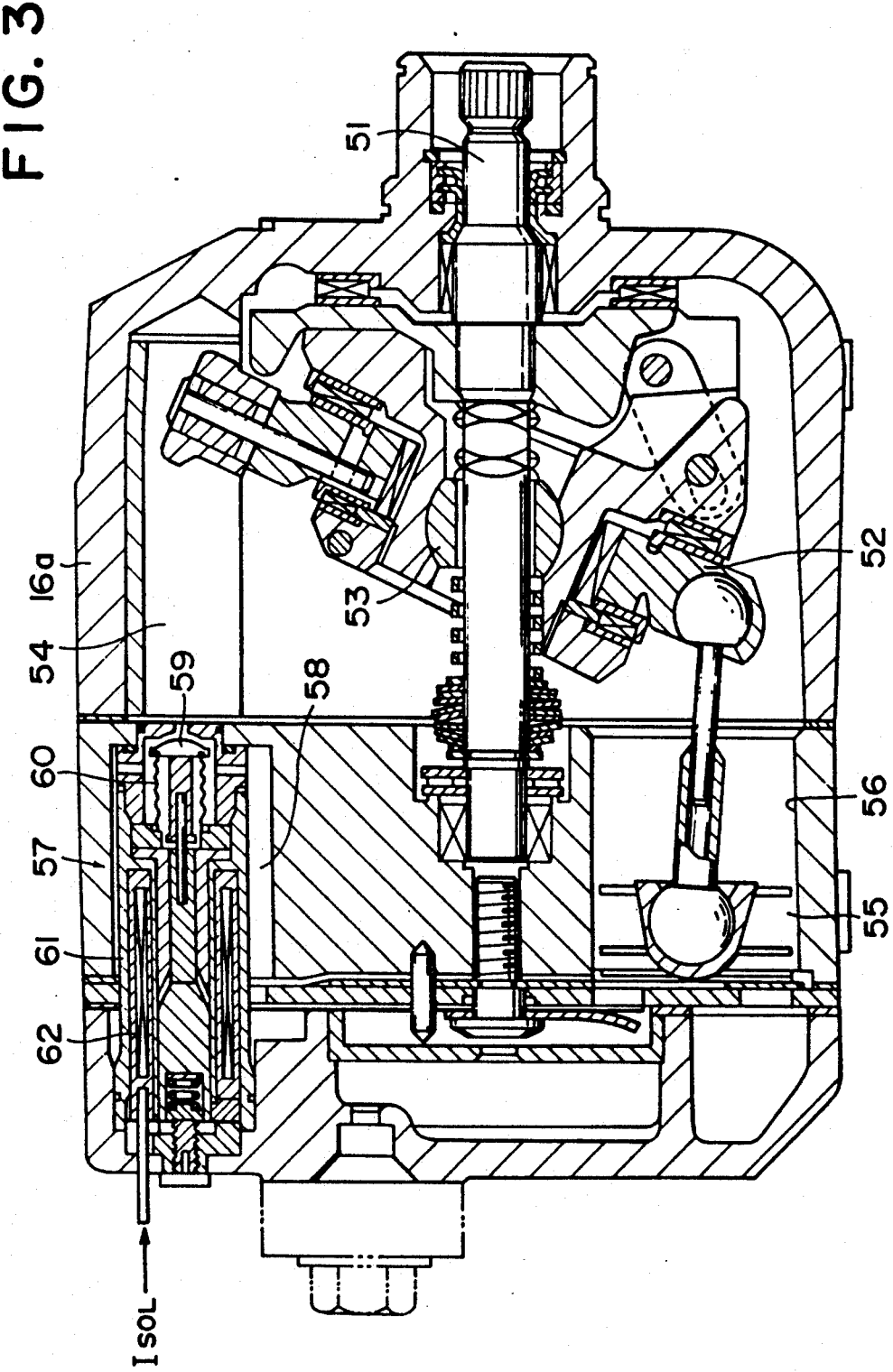
FIG. 3 shows a sectional view of the variable discharge capacity compressor referred to, in an example of the application of the present invention.

Variable discharge capacity compressor 16 is shaped in form of a wobble plate, the structure of which is roughly illustrated in FIG. 3, in reference to a wobble plate type variable discharge capacity compressor.

Driving shaft 51 connected to the engine (not indicated in the FIGURE) via electromagnetic clutch 18 is inserted into compressor body 16a, and wobble plate 52 is connected to driving shaft 51 via hinge ball 53. In crankcase 54 formed in compressor body 16a, this wobble plate 52 is supported by a hinge ball 53 as to be able to wobble on the driving shaft 51 and as to reciprocate piston 55 connected to wobble plate 52 within cylinder bore 56, according to the wobbling angle.

On compressor 16, pressure controlling valve 57 is installed as to face crankcase 54, and this pressure controlling valve 57 has valve 59 that adjusts the connection between crankcase 54 and air-intake chamber 58 connected to the air intake side, pressure-driven member 60 that activates the aforementioned valve 59 according to the pressure in the air-intake chamber 58, and solenoid 62 that activates the aforementioned valve 59 according to the flow rate of electrical current $I_{sol}$ (variable discharge capacity signals) flowing to electrical current $I_{sol}$ flowing to electromagnetic coil 61, the amount of the blow-by gas leaked from between piston 55 and cylinder bore 56 to crankcase 54 is controlled, and this gas is returned to the air-intake side.

Variable capacity structure 17 for changing the discharge capacity of compressor 16 by means of pressure control valve 57 is thus structured, and the flow rate of electrical current Isol rises, raising the magnetic force of solenoid 62, which activates valve 59 to constrict the connection between crankcase 57 and air-intake chamber 58; thereby reducing the blow-by gas leaking from crankcase 57 increases while the stroke of piston 55 becomes smaller, in other words, the discharge capacity of the compressor becomes smaller. In the air conditioner thus structured, the outdoor air or indoor air, introduced through outdoor air-intake 2 or indoor-intake 3 selected by indoor/outdoor air switching door 4 by the operation of fan 5, is cooling when passing through evaporator 6. This cooled air is divided, by air-mixing door 8 appropriately opened, into the air to pass through heater core 7 and the air to by-pass heater core 7, and at the downflow side of heater core 7, the air heated by passing through heater core 7 and the cooled air which has by-passed heater core 7 are mixed, so that the temperature will be desirably adjusted.

The air with the adjusted temperature is vented out into the passenger compartment from the vents 9, 10 and 11 selected by mode door 12, to heat the passenger compartment.

In order to control the air conditioner, microcomputer 19 is installed, in which are input, via multiplexer (MPX) 24 and A/D converter 25, the signals from temperature sensor 20 which at least senses the outdoor temperature, from temperature sensor 21, for sensing the temperature in the passenger compartment, from actinometer 22 for sensing the intensity level of sunlight, and from temperature sensor 23 mounted on evaporator 6 or the downflow side of evaporator 6. The signals are input through instrument panel 26 further discussed below.

This microcomputer 19 is well-known type which comprises a central processing unit (CPU), read only memory (ROM), random access memory (RAM), input/output port (I/O), and which processes/executes the aforementioned input signals according to the prescribed program, and controls, via each of output circuits 37a-37g, each of its equipment to be controlled, for example, actuators, 38a, 38b, 38c, fan 5, electromagnetic clutch 18, variable discharge capacity structure 17, and electromagnetic valve 39.

Instrument panel 26 comprises AUTO switch 27 automatically controlling the air conditioner, A/C switch 28 for turning on/off the operation of cooling cycle, OFF switch 29 for turning off the operation of the air conditioner, DEF switch 30 for manually setting the vent for DEF mode, REC switch 31 for manually setting the intake-air mode for indoor/outdoor circulation, temperature setter 32 comprising with the up/down switch for setting the temperature in the passenger compartment, MODE switch 33 for manually setting the air-vent mode, FAN switch 34 for manually setting the air volume sent by fan 5, and indicating unit 36, which is controlled by microcomputer 19 via circuit 35, for indicating the current operating condition of the air conditioner.

Figure 4:
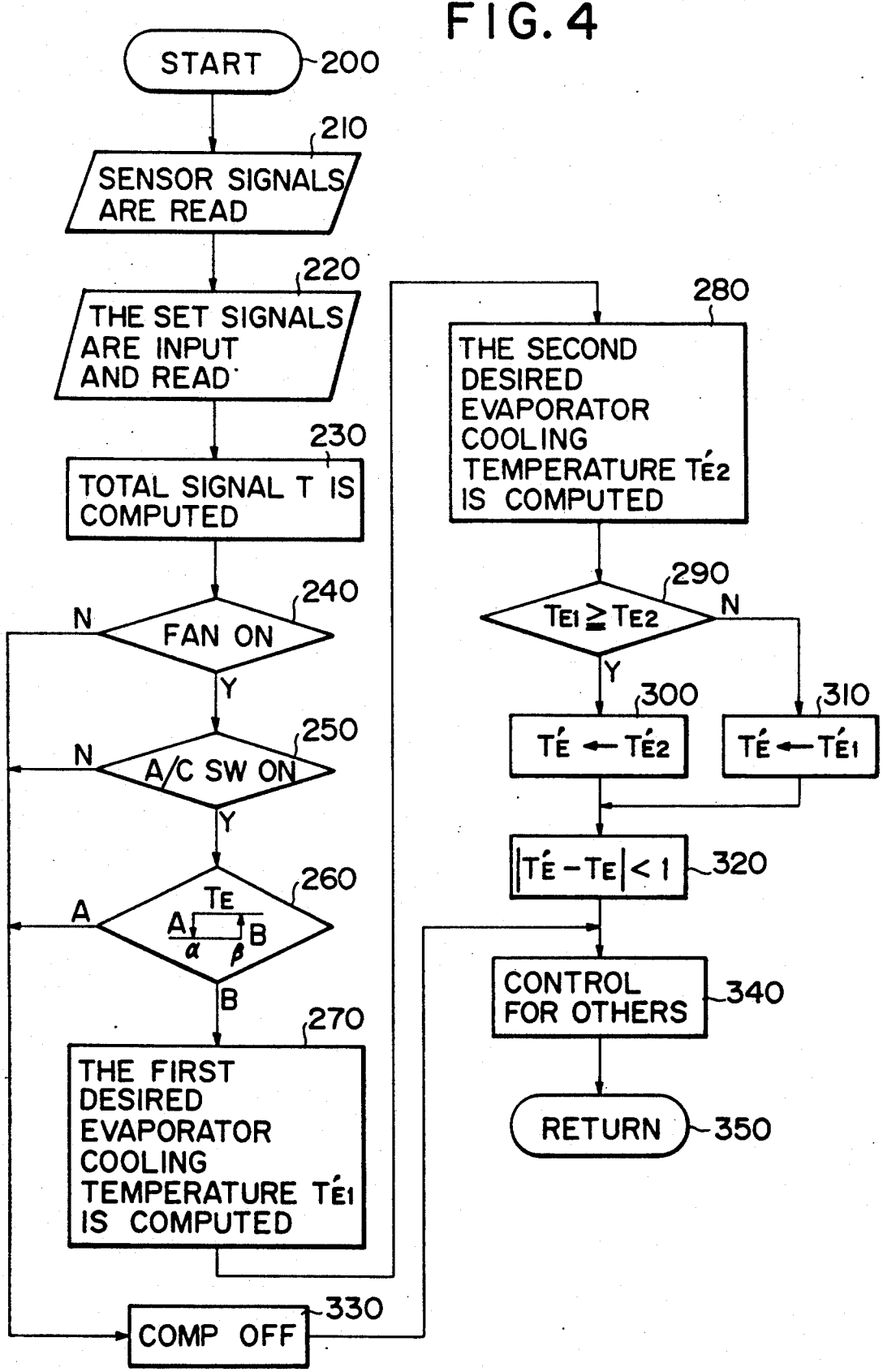
FIG. 4 shows a flow chart of the compressor discharge capacity control referred to, in an example of the application of the present invention.

FIG. 4 shows a flow chart of the controlling process conducted by the aforementioned microcomputer 19, in relation with the present invention. The following explanation is given in reference to the flow chart.

In FIG. 4, a flow chart is shown to explain the air controlling process of the air conditioner. The process shown in the flow chart begins with Step 200 and is conducted with regular intervals when a timer is set or when a jump command is given from other programs.

In Step 210, the signals detected by each sensor 20-23 are read in form of digital signals (passenger compartment temperature $T_r$, outdoor temperature $T_a$, actual cooling temperature of the evaporator $T_E$, sunlight intensity level $T_{sd}$). In Step 220, the set signal from the instrument panel 26, for example, the set temperature for the passenger compartment $T_{set}$ is read.

In Step 230, based on the environmental conditions inside/outside the passenger compartment, $T_r$, $T_a$, $T_{sd}$, $T_E$, $T_{set}$, the control signals corresponding to the heating load are computed, using T for the total signals, as shown by the following equation (1).

$$T = (T_r - 25) + a(T_a - 25) + bT_{sd} + c(T_E - 3) - d(T_{set} - 25) + e \quad (1)$$

In the equation, a, b, c and d mean arithmetic gains, and the e means a correction value. Each arithmetic gain is experimentally determined, taking it into consideration what level of impact passengers would feel at every change expressed by variable $T_r$. And, the T means that when its value is small, the cooling load is low, and high when its value is greater.

Following the computation of total signal T, in Step 240, the operation of fan 5 is decided; if the fan is in operation, the process proceeds to Step 250, and if it is not in operation, the process proceeds to Step 330, where the electromagnetic clutch 18 is turned off to stop the operation of the compressor 16.

In Step 250, whether A/C switch (A/C SW) 28 is on or off is examined; if it is turned on, the process proceeds to Step 260, and proceeds to Step 330 if it is turned off to stop the operation of compressor 16.

In Step 260, the degree of the evaporator temperature $T_E$ is decided. In this decision, if the $T_E$ is low, the B is switched to A at value $\alpha$ (for example, at 0.5° C.), and if the $T_E$ is high, the A is switched to B at value $\beta$ (for example, at 3° C.) by its hysteresis mechanism. If the decision results in B, the process proceeds to Step 270, and to Step 330 if the decision results in A, to stop the operation of compressor 16.

Figure 5:
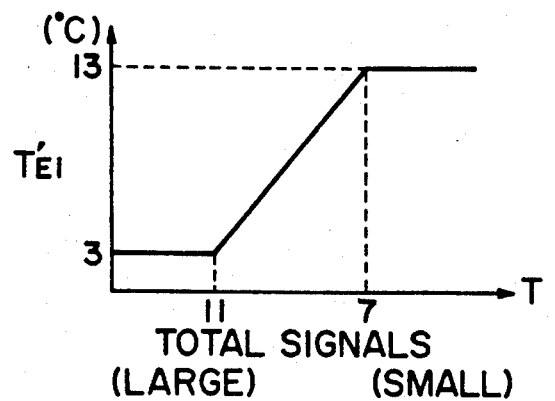
FIG. 5 shows a characteristic graph for computing the first desired cooling temperature $T'_{E1}$ of the evaporator, from the total signal T corresponding to the heat load signals.

In the aforementioned Step 260, if the decision is made for B by evaporator cooling temperature $T_E$, in other words, if the evaporator cooling temperature $T_E$ is judged as being higher than the degree almost as low as the freezing temperature $T'_{E1}$ ($T'_{E1}$ does not mean the desired temperature, but it means the corresponding signals to the desired temperature. But, hereinafter, it is called the desired cooling temperature for the sake of convenience.) is computed, using total signal T, in Step 270, as shown in FIG. 5. If total signal T is greater than 11 as a result of this computation and the cooling load is "high" (In the graph, the left side shows high and the right side shows low.), the first desired evaporator cooling temperature $T'_{E1}$ is set at 13° C. If total signal T is computed to be 7 or below and the cooling load is low, the first desired evaporator cooling temperature of $T'_{E1}$ is set at 13° C. And if total signal T is computed to be between 7 and 13, the first desired evaporator cooling temperature $T'_{E1}$ is set linearly at the degree between the aforementioned setting temperature degrees (3° C. and 13° C.).

Figure 6:
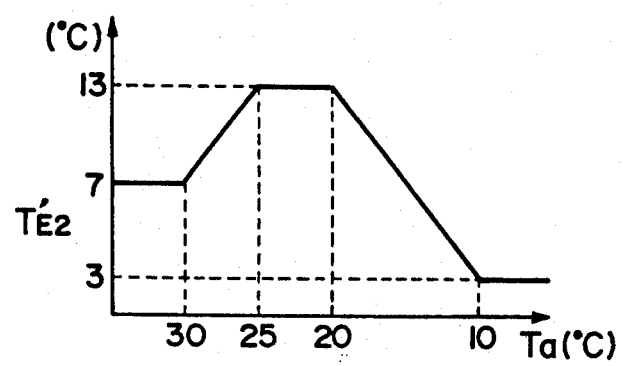
FIG. 6 shows a characteristic graph for computing the second desired cooling temperature $T'_{E2}$ of the evaporator, from outdoor temperature Ta.

In the aforementioned Step 270, after the desired cooling temperature of the first evaporator $T'_{E1}$ is set, the process proceeds to Step 280, where the desired cooling temperature of the second evaporator $T'_{E2}$ is computed from outdoor temperature Ta' as shown in FIG. 6. In this computation, the desired cooling temperature of the second evaporator $T'_{E2}$ is set at 3° C., when outdoor temperature Ta is at 10° C. or below, at 13° C. when outdoor temperature Ta is between 20° C. and 25° C., at 7° C. when outdoor temperature Ta is 30° or above, and set between the aforementioned set temperature degrees (3° C.-13° C. or 13° C.-7° C.) when outdoor temperature Ta is between 10° C. and 20° C. or between 25° C. and 30° C. This conversion graph shows the most appropriate desired evaporator cooling temperature required by the outdoor temperatures (the dehumidifying capacity of the evaporator).

In Step 290, the aforementioned first desired evaporator cooling temperature $T'_{E1}$ and the aforementioned desired evaporator cooling temperature $T'_{E2}$ are compared. And if the $T'_{E2}$ is lower, the second desired cooling temperature $T'_{E2}$ is selected, as the desired evaporator cooling temperature for controlling, in Step 300, and if the $T'_{E1}$ is lower, the first desired cooling temperature $T'_{E1}$ is selected, as the desired evaporator cooling temperature, in Step 310. In Step 320, $I_{sol}$ signals are adjusted so that a deviation $\Delta T$ between the desired evaporator cooling temperature $T'_E$ set in Step 300 or 310 and the present evaporator temperature $T_E$ will be 1° C. or below, and thus the compressor discharge capacity is controlled.

Accordingly, by selecting, as the desired evaporator cooling temperature, the lower of either the first desired evaporator cooling temperature computed from the total signals, or the second desired evaporator cooling temperature computed from the outdoor temperature, the reduction in the evaporator's dehumidifying capacity can be prevented, even if the temperature is set high in the passenger compartment when the outdoor temperature is high, or when the outdoor temperature is low, accompanied by high humidity.

In Step 340, following the control of the compressor, other equipment of the controller is controlled, and in Step 350, the process returns to the starting position to repeat a main routine.

Figure 7:
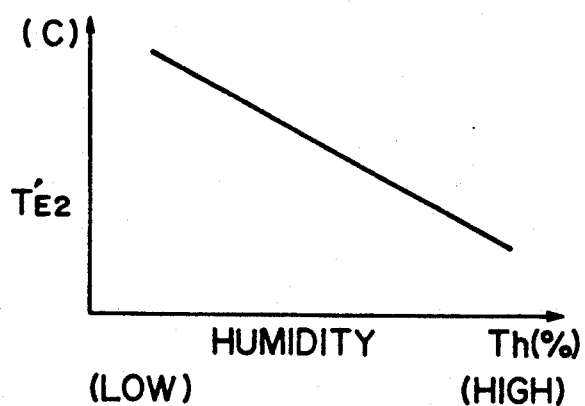
FIG. 7 shows a characteristic graph for computing the second desired cooling temperature $T_{E2}$ of the evaporator, from humidity Th in the passenger compartment.

It is needless to say that it is possible to make changes to or create variant forms of the present invention, using the aforementioned technical content as a reference. For instance, as shown in FIG. 7, the desired evaporator cooling temperature $T'_{E2}$ may be computed based on the humidity Th in the passenger compartment, instead of computing it from the outdoor temperature Ta. The pattern characteristic to be noted in this instance is that $T'_{E2}$ gets linearly lower as the Th rises higher. Therefore, it is conceivable that any variant form of invention which is not specifically stated in the additional claims can be implementable, and any variation, as long as it does not deviate from the essential goal of the present invention can be included in the scope of the claim of the present invention.

What is claimed is:

1. An automobile air conditioner compressor discharge capacity controller, which has an evaporator installed inside the air-conditioning duct of an automobile air conditioner and a variable discharge capacity compressor at least executing a cooling cycle together with the aforementioned evaporator, an expansion valve, and a condenser, and which controls, by means of its variable discharge capacity structure, the discharge capacity of the aforementioned variable discharge capacity compressor, are equipped with the following means:
   (a) an evaporator temperature-sensing means for sensing the temperature of the aforementioned evaporator;
   (b) a heat load signal-computing the heat load signals to control the air conditioner for environmental conditions inside/outside the passenger compartment, including the temperature in the passenger compartment, the outdoor temperature, and set temperature in the passenger compartment;
   (c) a first evaporator cooling temperature-setting means for setting a first desired temperature for the aforementioned evaporator based on the aforementioned heat load signals and on the pattern of the desired cooling temperature characterized by its being high when the cooling load is low;
   (d) a second evaporator cooling temperature-setting means for setting a second desired cooling-temperature for the aforementioned evaporator based on the pattern of the desired cooling temperature characterized by its being high when the outdoor temperature is moderate, and by being low when the outdoor temperature is low or high;
   (e) a desired cooling temperature-setting means that compares the first desired cooling-temperature set by aforementioned first evaporator cooling temperature-setting means, with the second desired cooling temperature set by the aforementioned second evaporator cooling temperature-setting means, when the aforementioned evaporator cooling temperature sensed by the aforementioned evaporator temperature-sensing means is above a specific value, and selects the lower desired cooling temperature;
   (f) a compressor discharge capacity controlling means for controlling the variable capacity structure of the aforementioned variable capacity compressor based on the desired cooling temperature selected by the aforementioned desired cooling-temperature selecting means.

2. An automobile air conditioner compressor discharge capacity controller, as mentioned in claim 1, in which a first desired cooling temperature is fixed at the lowest desired cooling temperature when the cooling load is high, will be fixed at the highest desired cooling temperature when the cooling load is low, and is characterized by the fact that it rises higher as the cooling load falls lower when the cooling load is between high and low.

3. An automobile air conditioner compressor discharge capacity controller, as mentioned in claim 1, in which a second desired cooling temperature is fixed at the lowest desired cooling temperature when an outdoor temperature is moderate, will fall lower as the outdoor temperature becomes less and less moderate, and is characterized by the fact that it will be fixed at low temperature when the outdoor temperature rises higher than the moderate level by the prescribed degrees.

4. An automobile air conditioner compressor discharge capacity controller, as mentioned in claim 3, in which the specific value of the second desired cooling temperature for the case when the outdoor temperature rises higher than the moderate level by the prescribed degree is larger than its specific value for the case when the outdoor temperature falls lower than the moderate temperature by the prescribed degrees.

5. An automobile air conditioner compressor discharge capacity controller, as mentioned in claim 1, in which the compressor is effectively controlled, when the operative switch for a cooling cycle is turned on and the fan is in operation.

* * * * *